Dec. 5, 1950  M. R. JONES  2,532,669
BALANCED THRUST SWIVEL JOINT
Filed May 19, 1947

Inventor
Marvin R. Jones
By
E. V. Hardway
Attorney

Patented Dec. 5, 1950

2,532,669

UNITED STATES PATENT OFFICE 2,532,669

BALANCED THRUST SWIVEL JOINT

Marvin R. Jones, Houston, Tex., assignor to Oil Center Tool Co., Houston, Tex., a corporation of Texas Application May 19, 1947, Serial No. 748,909

6 Claims. (Cl. 285—97.3)

This invention relates to a balanced thrust swivel joint.

An object of the invention is to provide a hydraulic swivel joint of such construction that the joint will not be subjected to a thrust load due to hydrostatic pressure.

The joint herein described has been specially designed for use in conductors through which fluid is conducted under relatively high pressure.

It is a further object of the invention to provide a swivel joint of the character described of such construction as to present areas which are packed in such manner that the pressure loads will be balanced and the joint will be subjected only to mechanical loads.

With the above and other objects in view the invention has particular relation to certain novel features of construction, operation and arrangement of parts, an example of which is given in this specification and illustrated in the accompanying drawings, wherein—

Figure 1:
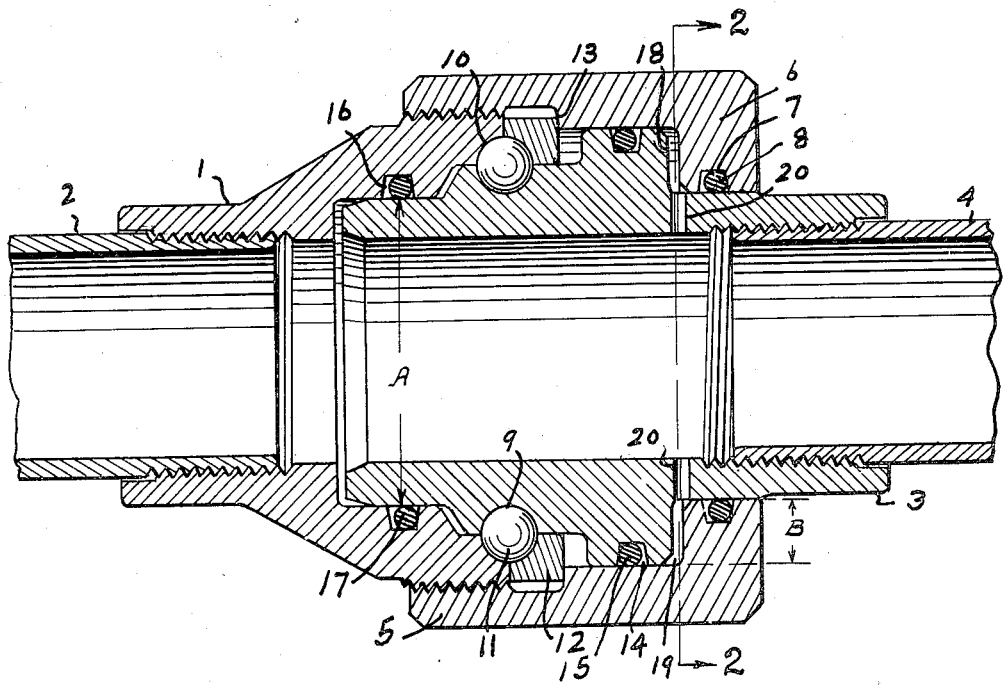
Figure 1 is a longitudinal, sectional view of the joint.

Referring now more particularly to the drawings wherein like numerals of reference designate the same parts in each of the figures, the numeral 1 designates the female joint member whose outer end may be reduced and internally threaded to receive an end of the flow conduit 2. The other end of this joint member is, preferably, enlarged or bell shaped and externally threaded.

The numeral 3 designates a tubular male joint member whose outer end may be reduced and internally threaded to receive an end of the conduit.

Surrounding said joint members and having one end screwed onto the enlarged end of the joint member 1 there is a clamp 5 whose other end is formed with an internal flange 6 which closely surrounds the reduced end of the joint member 3. This flange is formed with an internal groove 7 to receive an annular seal ring, preferably an O-ring 8 to form a fluid tight seal between said flange and the male joint member. The joint member 3 is formed with an external annular groove 9 and the inner end of the joint member 1 is formed with a registering groove 10, said grooves forming a raceway for the bearings 11. In the present illustration these bearings are shown as spherical although other types of bearings may be employed.

In the present illustration there is a retainer ring 12 around the male joint member which is formed with a groove, supplementing said raceway and retaining the bearings in place. This retainer ring 12 is locked in place, in assembling the joint, by means of an internal annular shoulder 13 carried by the clamp 5 and which abuts said retainer ring, as shown in Figure 1.

With the parts assembled as above described the joint members will be retained against relative longitudinal movement.

Between the bearings and the flange 6 the male joint member is enlarged, externally, in diameter to fit snugly within the clamp 5 and this enlarged portion is formed with an external annular groove 14 to receive a seal ring 15 which forms a seal between the clamp 5 and the male joint member. The ring 15 is, preferably, an O-ring.

On the other side of the bearings the inner end of the male joint member 3 is reduced, externally, in diameter and fits snugly in the corresponding portion of the female member 1 which is reduced internally in diameter and said reduced portion of the female member 1 is provided with an internal annular groove 16 in which there is located a seal ring, preferably, an O-ring 17 to form a seal between said members.

The outwardly thickened portion of the male joint member forms a bearing with the corresponding inner wall of the clamp 5 on opposite sides of the seal ring 15 and the reduced inner end of said male member forms a bearing with the correspondingly reduced portion of the female member on opposite sides of the seal ring 17.

The flange 6 is spaced from the annular end face 18 of the outwardly thickened portion of the male joint member thus providing an annular pressure chamber 19 into which one or more ducts 20 lead from the interior of the male joint member 3.

Figure 2:
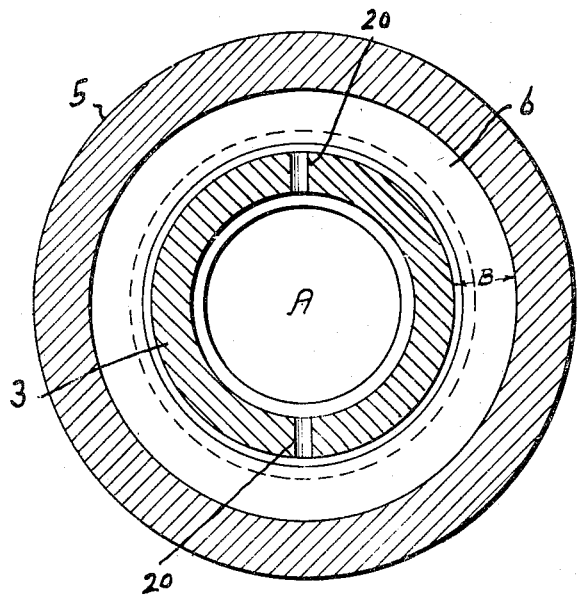
Figure 2 is a cross-sectional view taken on the line 2—2 of Figure 1.

The pressure of the fluid in the chamber 19 will, therefore, be the same as the pressure of the fluid flowing through the swivel joint. The pressure of the fluid in the chamber 19 will, therefore, be exerted against the face 18, the radial diameter of which is indicated in Figures 1 and 2 by B.

The construction of the joint is such that this pressure area will equal the pressure area indicated in Figure 1 by A; that is to say the pressure areas on opposite sides of the bearings exerted against the male joint member will be the same and the joint member bearings will not be subjected to the pressure load.

In some cases the joint may be subjected to external mechanical force which will augment the pressure applied to one of said pressure areas and which will tend to separate said joint members; in such case the pressure areas should be so varied as to neutralize said external mechanical force.

It is apparent that variations may be readily made in the design of the swivel joint and it is to be understood that the drawings and description are illustrative of what is now considered to be a preferred form of the invention by way of illustration only while the broad principle of the invention will be defined by the appended claims.

What I claim is:

1. A swivel joint including, a pair of tubular joint members having their end portions telescoping each other, bearing means engaging the joint members for rotatably securing the telescoping members to each other and for preventing relative axial movement of said members with respect to each other, and means on each member exposed to the fluid pressure within each joint for balancing the pressure acting on said joint members, whereby the pressure which would normally urge said members toward a separated position is nullified and end thrust on the bearing means is eliminated.

2. A swivel joint including, an outer tubular member, an inner tubular member having its end portion engaged within the outer tubular member, bearing means disposed between the outer and inner members for rotatably securing the members to each other and for preventing relative axial movement of the members with respect to each other, an annular enlargement on the inner member beyond the extremity of the outer member, an annular clamp removably secured to the end of the outer member and confining the enlargement, and means for directing the pressure from within the joint into the area between the outer face of said enlargement and said clamp, whereby the forces acting on the joint members by reason of the pressure of the fluid present in said joint are balanced and end thrust on the bearing means due to said pressure is eliminated.

3. A swivel joint including, an outer tubular member, an inner tubular member having its end portion engaged within the outer tubular member, bearing means disposed between the outer and inner members for rotatably securing the members to each other and for preventing relative axial movement of the members with respect to each other, an annular enlargement on the inner member beyond the extremity of the outer member, an annular flanged clamp element removably secured to the outer member and confining the enlargement with the flange of said element being spaced from the outer face of the enlargement to form a chamber therebetween, means for establishing communication between the chamber and the bores of the joint members, whereby the pressure fluid within the joint members may enter said chamber and act upon the outer area of the enlargement as well as upon the area of the flange of said clamp element to develop a force against these areas which opposes the force of the internal pressure normally tending to separate the joint members.

4. A swivel joint as set forth in claim 3, wherein the areas exposed within the chamber may be varied as required not only to balance the force of the internal pressure on the joint but also to balance an external mechanical force acting on one of the joint members in a direction which places excessive end thrust on the bearing means.

5. A swivel joint as set forth in claim 2, together with a sealing means between the engaging joint members, and an additional sealing means between the enlargement and clamp and also between the clamp and inner joint member.

6. A swivel joint as set forth in claim 3, together with a sealing means between the engaging joint members, and additional sealing means at each end of the chamber which is formed between the enlargement and the clamp element.

MARVIN R. JONES.

REFERENCES CITED

The following references are of record in the file of this patent:

UNITED STATES PATENTS

| Number | Name | Date |
| --- | --- | --- |
| 1,961,583 | Hamer | June 5, 1934 |
| 2,373,280 | Weber | Apr. 10, 1945 |
| 2,382,375 | Allen | Aug. 14, 1945 |
| 2,459,981 | Warren | Jan. 25, 1949 |